United States Patent [19]

Sugiura et al.

[11] Patent Number: 4,843,948
[45] Date of Patent: Jul. 4, 1989

[54] VACUUM-OPERATED BRAKE BOOSTER WITH A KEY AND RETAINER THEREFOR

[75] Inventors: Yuzuru Sugiura, Anjo; Akihiko Miwa, Toyoake, both of Japan

[73] Assignee: Aisin Seiki Kabushiki Kaisha, Aichi, Japan

[21] Appl. No.: 104,955

[22] Filed: Oct. 6, 1987

[30] Foreign Application Priority Data

Oct. 6, 1986 [JP] Japan .................. 61-153535

[51] Int. Cl.⁴ .................................. F15B 9/10
[52] U.S. Cl. .................. 91/369.4; 91/376 R
[58] Field of Search ............. 91/369 C, 376 R, 369 A

[56] References Cited

U.S. PATENT DOCUMENTS

| | | | |
|---|---|---|---|
| 4,043,251 | 8/1977 | Ohmi | 91/376 R |
| 4,406,213 | 9/1983 | Haar | 91/369 C |
| 4,472,997 | 9/1984 | Ohmi . | |
| 4,487,105 | 12/1984 | Harrison | 91/376 X |
| 4,587,885 | 5/1986 | Boehm et al. . | |
| 4,590,845 | 5/1986 | Tateoka et al. . | |
| 4,594,937 | 6/1986 | Meynier et al. . | |
| 4,598,625 | 7/1986 | Belart . | |
| 4,619,185 | 10/1986 | Mori et al. . | |
| 4,643,076 | 2/1987 | Satoh | 91/376 X |

FOREIGN PATENT DOCUMENTS 107945  7/1982  Japan ................ 91/369 C

Primary Examiner—Robert E. Garrett
Assistant Examiner—Mark A. Williamson
Attorney, Agent, or Firm—Burns, Doane, Swecker & Mathis

[57] ABSTRACT

A vacuum-operated brake booster comprises an axially movable power piston and a plunger axially movable in a cavity of the power piston. A valve disposed within the cavity cooperates with seats on the plunger and power piston to regulate pressure in a variable pressure chamber. A key serves as a stop to limit travel of the power piston and plunger. The key includes a base portion and a pair of parallel legs which extend into a radial hole of the power piston. The legs straddle and press against the plunger. Elastic retainers are snap-fit onto the ends of the key member. The elastic retainers are wider than the radial hole to retain the key in the hole.

2 Claims, 1 Drawing Sheet

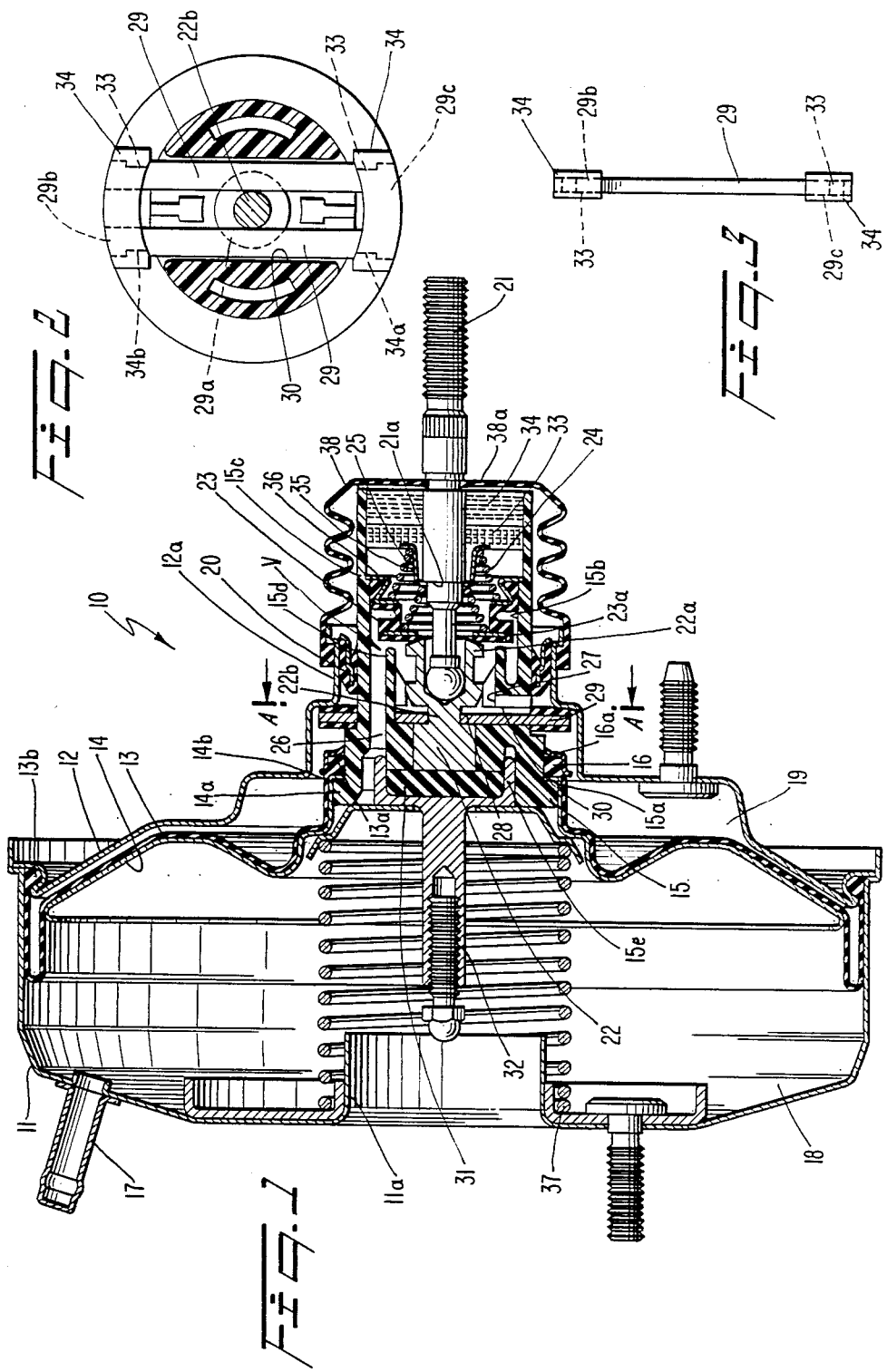

VACUUM-OPERATED BRAKE BOOSTER WITH A KEY AND RETAINER THEREFOR

BACKGROUND OF THE INVENTION

1. FIELD OF INVENTION

This invention generally relates to a vacuum-operated brake booster, and more particularly to a retainer for a key which limits the retraction travel of a power piston and a valve mechanism.

2. DESCRIPTION OF THE PRIOR ART

A vacuum-operated brake booster having a key which limits the retraction travel of a power piston and a valve mechanism by contacting a housing is disclosed in U.S. Pat. No. 4,587,885. The key of this vacuum-operated brake booster is provided with a pair of legs inserted into a radial hole of the power piston. A valve plunger is slidable axially in response to movement of a push rod coupled with a brake pedal. The legs are inserted into a circular center groove of the valve plunger so as to straddle and press against the valve plunger. The key is further provided with a retainer arm portion which engages an outer circumferential surface.

The key is prevented from radially falling out of the hole by an engagement between the ends of the legs and a rib formed in the radial hole of the power piston. This engagement is accomplished by effecting a plastic deformation of the legs by means of a tool.

The above prior art vacuum-operated brake booster, however, presents a manufacturing drawback due to the manner of retaining the key in the hole. That is, when deforming the legs by the tool, the power piston, formed of a resin, may be damaged.

SUMMARY OF THE INVENTION

It is, therefore, an object of the present invention to provide an improved vacuum-operated brake booster which can obviate the above prior art drawbacks.

It is another object of the present invention to enable the vacuum operated brake booster to be manufactured without damaging the power piston when the retention of the key is effected.

It is still another object of the present invention to provide a reliable retention of the key.

In one illustrative embodiment of the present invention, there is provided a vacuum-operated brake booster which includes a housing and a power piston axially movable in the housing. The power piston includes an axial cavity and a radial hole. A diaphragm divides the inside of the housing into a constant pressure chamber and a variable pressure chamber. An outer edge of the diaphragm is hermetically connected to the housing, and an inner edge of the diaphragm is hermetically connected to the power piston. A valve plunger is connected to a pushrod, the latter interlocking with a brake pedal. The plunger is inserted into the radial hole of the power piston. A control valve is axially movable in the cavity of the power piston to selectably communicate the variable pressure chamber either with the constant pressure chamber or with the atmosphere in response to a depression of the brake pedal. A key member is inserted into the radial hole for limiting travel of the power piston and plunger. The key member includes a base portion and a fork portion inserted into a circular groove of the valve plunger so as to straddle and press against the valve plunger. Elastic retainer means is coupled with the base portion and an end of the fork portion of the key member to retain the latter in the radial hole.

Even though the power piston is moved axially when communication is established between the variable pressure chamber and the atmosphere in response to the depression of the brake pedal, the key member is retained in the radial hole by the engagement between the power piston and the elastic retainer means. It is not necessary to deform the key member so as to retain the key member, the retention of the key member is assured solely by mounting the elastic retainer means on the key member.

BRIEF DESCRIPTION OF THE DRAWINGS

FIG. 1 is a longitudinal cross-sectional view of a vacuum-operated brake booster in accordance with the present invention;

FIG. 2 is a cross-sectional view taken along line A—A in FIG. 1; and

FIG. 3 is a side view of a key member according to the present invention.

DETAILED DESCRIPTION OF THE PREFERRED EMBODIMENT OF THE INVENTION

Referring now to the drawings, particularly to FIG. 1, a vacuum-operated brake booster 10 is provided with a housing which comprises a front shell 11 and a rear shell 12. Disposed in the housing is an axially movable power piston 15 which is preferably formed of a resin. The power piston is provided with a cylinder portion 15c at its center portion. The cylinder portion 15c hermetically and slidably penetrates a seal 20 disposed in a center hole 12a of the rear shell 12. A power plate 14 provided with an inner tube portion 14a is disposed in the housing. The power plate 14 is connected with a stepped portion 15a of the power piston 15 at a flange portion 14b formed in an end of the inner tube portion 14a. In one side surface of the power plate 14, a diaphragm 13 is disposed, an inner edge 13a of the diaphragm 13 being hermetically fitted over an outer circumferencial surface of the power piston 15. The inner edge 13a of the diaphragm 13 is surrounded by a circular ring 16 having a engaging projection 16a at its inner circumferential surface so as to compress the diaphragm inner edge 13a axially and radially. As a result, the flange portion 14b of the power plate 14 is pressed against the stepped portion 15a of the power piston 15 so as to prevent axial movement of the inner edge 13a relative to power piston 15. An outer edge 13b of the diaphragm 13 is hermetically compressed by a connection between the front shell 11 and the rear shell 12. According to the above structure, the housing is provided with a constant pressure chamber 18 which receives negative pressure from an intake manifold (not shown) through a port 17. Disposed on the other side of the diaphragn 13 is a pressure chamber 19 which is selectably communicated either with the constant pressure chamber 18 or with the ambient atmosphere by means of a valve mechanism V disposed in an axial cavity 15b of the power piston 15.

The valve mechanism V includes a valve plunger 22 and a control valve 23. The valve plunger 22 is connected to a pushrod 21, the latter jointed to a brake pedal (not shown) by means of a ball-joint mechanism. The valve plunger 22 is slidably guided in the power piston 15. The control valve 23 is hermetically connected to the cylinder portion 15c of the power piston 15 by a retainer 36 and controls the communication between the variable pressure chamber 19 and the atmosphere in cooperation with the valve plunger 22. The control valve 23 is provided with a seal surface 23a biased forwardly (i.e. to the left in FIG. 1) by a conical spring 24, one end portion of which is connected to a stepped portion 21a of the pushrod 21. The valve plunger 22 is biased rearwardly by a conical spring 25 which is interposed between the retainer 36 and a spring seat 35 connected to the stepped portion 21a of the pushrod 21. As a result, the seal surface 23a of the control valve 23 and a circular seat surface 22a of a rear end portion of the valve plunger 22 hermetically contact each other when the brake pedal is not depressed.

The power piston 15 includes a seat portion 15d which is contactable with the circular seat surface 22a of the valve plunger 22 so that the seat portion 15d may surround the contact portion between the seal surface 23a of the control valve 23 and the circular seat surface 22a of the valve plunger 22. Communication passages 26, 27 which communicate with the constant pressure chamber 19 and the variable pressure chamber 18 are formed in the power piston 15. The communication between those chambers 18, 19 through the communication passages 26, 27 is closed by a hermetical contact between the seat portion 15d of the power piston 15 and the seal surface 23a of the control valve 23. A return spring 37 constantly biases the power piston 15 rearwardly.

A circular groove 28 is provided in an outer circumference surface of the valve plunger 22. A key member 29 is engaged in the circular groove 28 while a gap is formed between a rear end surface of the circular groove 28 and a rear side surface of the key member 29. The key member 29 extends into a radially extending hole 30 formed in the power piston 15. When the brake pedal is not depressed, a front side surface of the key member 29 contacts a front side surface of the hole 30. An opening 15e which communicates with the cavity 15b is formed in the center portion of the power piston so as to open toward the constant pressure chamber 18. An output rod 32 extends into the opening 15e. A reaction disc 31 made of rubber is compressed between the front end of the valve plunger 22 and the output rod 32. The output rod 32 pushes a piston of a master cylinder (not shown) which is hermetically fitted in a center hole 11a of the front shell 11 in a conventional manner.

The key member 29 includes a base portion 29c and a fork portion comprising a pair of parallel legs 29a, as can be seen in FIGS. 2, 3. The legs extend into the circular groove 28 of the valve plunger 22 so as to straddle and press against a small diameter portion 22b of the valve plunger 22. A gap is formed between the legs and the wall of the hole 30. Formed in the base portion 29c and in the ends 29b of the legs are slots 33. Installed over the base portion 29c and the leg ends 39b are elastic members 34. Each elastic member 34 has a larger circumferential width than that of the hole 30. The elastic members 34 are provided with tongues 34a which fit into the slots 33.

OPERATION OF THE PREFERRED EMBODIMENT

When the brake pedal (not shown) is not depressed, the power piston 15 is pushed toward the rear side by the return spring 37. Rear sides of the elastic members 34 contact a forwardly facing surface of the rear shell 12, and the vacuum-operated brake booster 10 is held in a state shown in FIG. 1. In this state, the seal surface 23a is separated from the seat portion 15d of the power piston 15, and the seal surface 23a hermetically contacts the seat surface 22a of the valve plunger 22. As a result, both chambers 18, 19 receive a negative pressure through the port 17. The chamber 19 receives such negative pressure from the chamber 18 through the passages 26, 27.

When the brake pedal is depressed, the valve plunger 22 is moved forwardly in response to the forward movement of the pushrod 21. Simultaneously, the control valve 23 is moved forwardly by the conical spring 24, 25 until the seal surface 23a contacts the seat portion 15d. When the seal surface 23a hermetically contacts the seat portion 15d of the power piston 15, the movement of the control valve 23 is stopped and the communication between the chambers 18, 19 is interrupted. In this state, the seat surface 22a of the valve plunger 22 is separated fromm the seal surface 23a of the control valve 23 as the valve plunger 22 is further moved toward the front side in response to the movement of the pushrod 21. As a result, the variable pressure chamber 19 communicates with the atmosphere through a passage hole 38a of a boot 38, an air filter 33, 34 and a gap between the seal surface 23a of the control valve 23 and the seat surface 22a of the valve plunger 22. A pressure differential is thus established between the chambers 18, 19, causing the power piston 15 and the power plate 14 to be moved forwardly. Accordingly, the vacuum-operated brake booster performs a brake-boosting action by pushing the piston of the master cylinder via the output rod 32.

When the depression force of the brake pedal is released, the power piston 15 is returned to a rest position shown in FIG. 1.

In the present invention, the key member 29 is prevented from falling radially out of the hole 30 of the power piston 15 by the radial engagement between the elastic member 34 and the power piston 15. That is, since the circumferential dimension of the elastic members 34 is greater than that of the hole 30, the elastic members retain the key member in the hole. According to the present invention, it is thus not necessary to deform the key member 29 by means of a tool to prevent the loss of the key member 29. Therefore, there is no danger of the power piston 15 being damaged during manipulation of the tool. The elastic retainer members are easily mounted on the key member by snapping the retainer members onto the slotted ends of the key member. As a result, the vacuum-operated brake booster 10 can be more easily and safely manufactured. Since the retracted position of the power piston 15 and the valve mechanism V is regulated by means of an engagement between the elastic members 34 and the rear shell 12, the generation of an allophone or noise is prevented by a damping function performed by the elastic material of the retainer members 34 when the latter engage the shell 12.

Furthermore, since the inner edge 13a of the diaphragm 13 is surrounded by the circular ring 16 so as to compress the inner edge 13a toward the axial and diameter direction, a reliable hermetical connection between the inner edge 13a of the diaphragm 13 and the power piston 15 is achieved without difficulty.

Although the present invention has been described in connection with a preferred embodiment thereof, it will be appreciated by those skilled in the art that modification, additions, deletions, and substitutions may be made without departing from the spirit and scope of the invention as defined in the appended claims.

What is claimed is:

1. A vacuum-operated brake booster comprising:

a housing;

a power piston axially movable in said housing and having a cylinder portion, an axial cavity and a radial hole, said radial hole extending in a radial direction and said cylinder portion having an outer surface;

a diaphragm disposed within said housing to divide the interior of said housing into a constant pressure chamber and a variable pressure chamber, an outer edge of said diaphragm being hermetically connected to said housing, an inner edge of said diaphragm being hermetically sealed to said power piston;

a valve plunger connected to a pushrod, said pushrod being adapted to be connected to a brake pedal to move said plunger axially when the brake pedal is depressed;

a control valve disposed in said cavity and being selectively engageable with seats on said plunger and power piston for controlling communication between said pressure chambers, said value being movable in respose to movement of said plunger to selectively communicate said variable pressure chamber with either said constant pressure chamber or with the ambient atmosphere;

a key member for limiting axial movement of said power piston and said plunger, said key member having a circumferentially extending base portion and a fork portion including a pair of parallel legs, the key member extending into said hole and being movable axially of said power piston within said hole, said legs straddling and pressing against said plunger; and elastic retainer means separate from said diaphragm and coupled to said base portion and said fork portion, said retainer means including first and second elastic retainer members, the first retainer being snap-fitted on said base portion after insertion of the key member into the radial hole and the second member being snap-fitted on free ends of both said legs after insertion of the key member into the radial hole, said base portion and the free ends of both legs extending outward beyond the outer surface of the cylinder portion of the power piston, said first and second retainer members being symmetrically positioned with respect to the radial direction of said hole and being wider than said hole for retaining said key member in said hole and being in contact with said housing when the brake booster is not operated, said first retainer member being connected to said base portion by a tongue and slot arrangement and said second retainer member being connected to said free ends by a tongue and slot arrangement, said radial hole being positioned with respect to the inner edge of the diaphragm such that said first and second retainer members are spaced from the inner edge of the diaphragm.

2. Apparatus according to claim 1 wherein a slot of each said connection is disposed in said key member.

* * * * *